United States Patent [19]
Alcorn

[11] Patent Number: 5,913,561
[45] Date of Patent: Jun. 22, 1999

[54] TOP COVER "TARPPING" SYSTEM FOR ROLL-OFF CONTAINER TRUCKS

[76] Inventor: John William Alcorn, P.O. Box 50610, Jacksonville Beach, Fla. 32240

[21] Appl. No.: 08/937,481

[22] Filed: Sep. 25, 1997

Related U.S. Application Data

[60] Provisional application No. 60/041,464, Mar. 25, 1997.

[51] Int. Cl.$^6$ ........................................................ B60P 7/02

[52] U.S. Cl. ...................................... 296/100.1; 298/23 R

[58] Field of Search ................................ 296/101, 100.02, 296/100.06, 100.08, 100.1; 298/23 R, 23 C

[56] References Cited

U.S. PATENT DOCUMENTS

| | | | |
|---|---|---|---|
| 2,606,674 | 8/1952 | Edwards | 296/101 |
| 4,378,188 | 3/1983 | Hardwick | 298/23 C |
| 4,420,181 | 12/1983 | Hallburg | 296/100.08 |

*Primary Examiner*—Dennis H. Pedder

[57] ABSTRACT

This invention is a rigid tarpping system installed on roll-off container trucks to cover and contain materials in transit. This tarpping system utilizes the raising and lowering operations of the truck's hoist to operate without requiring auxiliary electrical, hydraulic and/or pneumatic input or it can be fitted with optional equipment to operate independently of the truck's hoist system.

8 Claims, 10 Drawing Sheets

TOP COVER "TARPPING" SYSTEM FOR ROLL-OFF CONTAINER TRUCKS

This application claims the benefit of U. S. Provisional application Ser. No. 60/041,464 filed Mar. 25, 1997.

BACKGROUND OF THE INVENTION

This invention relates to the top covering or "tarpping" of open top containers while in transit on roll-off container trucks.

Prior to this invention, open top containers in transit on roll-off containers trucks were covered or "tarpped" by the operator manually spreading a fabric cover or tarpaulin over a filled open top container and fastening it in place or using a two-arm, mechanical assist system attached to the truck chassis to spread a fabric cover or tarpaulin from front to rear after which the edges may or may not be manually fastened in place. Since such placement is at the option of the truck operator, many times there are filled containers being transported without a top cover or "tarp" when there should be one in place to comply with regulations and for public safety.

Tarpping by the current, fully manual method involves an operator climbing atop the filled container, which is sometimes eight feet high when on the ground and twelve feet high when on the truck, carrying a fabric cover which is at least ten feet wide by twenty-five feet long, walking atop the load in most instances to spread the tarpaulin over the top and down the sides. The corners and edges are then fastened in place by the operator while clinging to the sides of the container. The operators, while manually placing the tarp on each load, can and do get injured falling into or off of the containers. When the truck arrives at the unloading site, the operator must unfasten and remove the fabric cover. Sometimes the cover, after being unfastened, may be pulled off by the operator while standing on the ground, but many times the operator must climb atop the load to free a snagged cover. Once removed, time and labor by the operator is required to fold the bulky cover and store it on the truck until it is needed for the next load.

Tarpping by using the two arm, mechanical assist method usually reduces the operator's labor and risks by allowing the operator to spread the fabric cover from front to rear without climbing atop the filled container. Often the arms and/or fabric hang up on the container and/or the contents and the operator must climb atop or upon the filled container to free the obstructions. Usually, the free edges of the spread fabric are not fastened since fastening would require the operator to climb around on the container on every pick up. Such non-secured edges allow materials to be discharged from the container in transit. When the truck arrives at the unloading site, the fabric cover or tarpaulin must be rewound on a spool prior to dumping every time. This action may also require the operator to climb atop or upon the container to free the cover and/or arms.

Thus, prior methods, systems and procedures for tarpping have been time consuming, hazardous to the operators, inadequate or non-existent.

BRIEF SUMMARY OF THE INVENTION

The invention relates to an apparatus that is mounted on roll-off container trucks to provide a safer, more efficient system to cover and contain the materials being transported. This invention also utilizes the inherent raising and lowering operations of the truck's hoist rails to operate without requiring auxiliary electrical, hydraulic and/or pneumatic input.

It is a primary object of this invention to provide a tarpping apparatus or system for use on roll-off container trucks which will improve the top covering operations or tarpping of open top containers in transit on roll-off container trucks by reducing the time required per run, reducing the public's exposure to debris being discharged, eliminating the necessity for the operators to climb atop or upon the containers, reducing the operators' exposures to injuries and strain, reducing the operators' exposures to inclement weather, eliminating the ripping and tearing of tarpaulins, insuring the covering of every container in transit and withstanding severe service such as the tarpping of C and D debris filled containers; the apparatus or system consisting of a hinged, rigid top cover, a vertical support rack and two support struts without requiring auxiliary motors, pumps, controls, wiring and/or hydraulically operated cylinders, the roof of the top cover utilizing full-length, multiple sub panels having corrugations or ribs to accept portions of the forces imposed on the cover. The longitudinal corrugations or ribs improve the moment of inertia of the roof panel to improve beam strength especially when in contact with the container contents without creating obstructions to the flow of materials out of the container during dumping.

It is a secondary object of this invention to provide optional auxiliary motors, pumps, controls, screw jacks and/or hydraulically operated cylinders to operate the tarpping apparatus or system when the truck's hoist system to which it is attached is or is not in motion.

It is, also, an object of this invention to provide interconnecting slip joints between adjacent roof sub panels and between adjacent side rails and roof sub panels to fasten one to the other without welding or bolting, said sub panels having longitudinally corrugated ribs.

It is a further object of this invention to provide telescoping, vertical posts to support the top cover and enhance, via mechanical or gas spring inclusion, the opening and closing movement of the top cover during on and off loading of the containers.

BRIEF DESCRIPTION OF THE SEVERAL VIEWS OF THE DRAWING

FIG. 2A is an enlarged view of the rail to sub-panel sliding joint on the driver side.

FIG. 2B is an enlarged view of the sub-panel to sub-panel sliding joint.

FIG. 2C is an enlarged view of the rail to sub-panel sliding joint on the passenger side.

FIG. 3A is a side view of the FIG. 3 vertical support rack.

FIG. 4A is a side view of the FIG. 4 vertical support rack.

FIG. 8A is an enlarged view of a portion of FIG. 8.

DETAILED DESCRIPTION OF THE INVENTION

Figure 1:
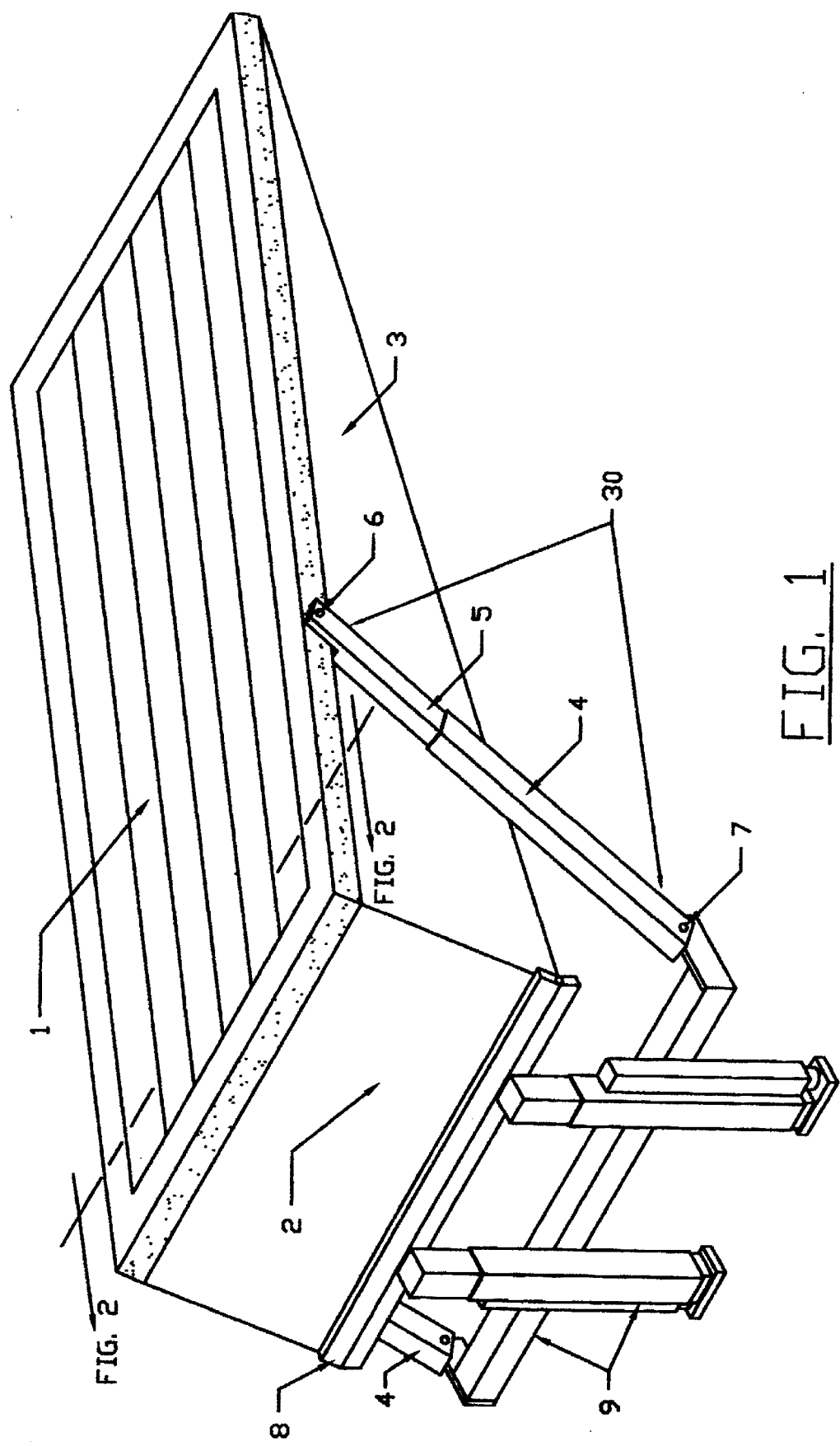
FIG. 1 is an illustration of the assembled tarpping apparatus or system of this invention without auxiliary power prior to installation on a roll-off container truck.
Figure 2:
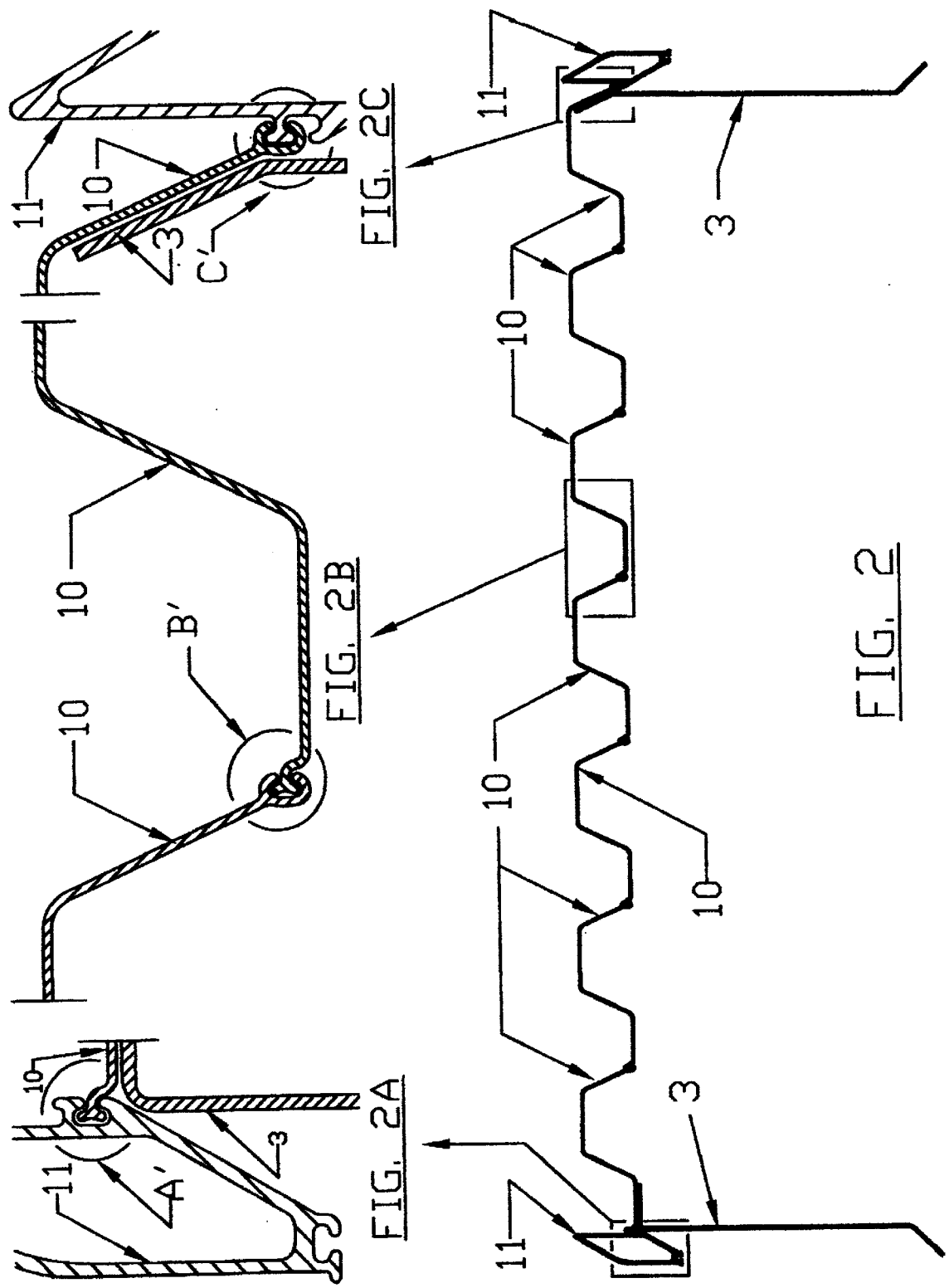
FIG. 2 is a sectional view of the roof and side panels.

FIG. 1 illustrates, via perspective drawing, an assembled Tarpping Apparatus or System of this invention prior to being installed on a roll-off container truck. Rectangular roof panel 1 consists of longitudinally disposed corrugated panels and side rails as shown in FIG. 2. Completing the upper portion of the structure are rectangular front panel 2 and two triangular shaped side panels 3. Outwardly supporting the upper structure are two buttress-like struts 30 consisting of an outer sleeve 4 and an inner sleeve 5 of the telescoping strut; upper pins 6 and lower pins 7 connecting the struts 30 to roof panel 1 at the top end and to the vertical support rack 9 at the bottom end. The telescoping struts 30 allow movement for the strut length to adjust for different size containers and for no container on board. The lower edge of front panel 2 is attached via hinge-like connection 8 to the upper end of the vertical support rack 9, which is shown enlarged and in more detail in FIG. 3 and FIG. 4.

FIG. 2, a cross sectional view where noted on FIG. 1, illustrates the multiplicity of corrugated sub-panels 10, "T" to "C" interconnected one to the other as shown at slip joint B' in FIG. 2B and side rails 11, "T" to "C" interconnected to sub-panels 10 as shown at slip joint A' in FIG. 2A and slip joint C' in FIG. 2C. Side panels 3 are attached to the corrugated roof sub-panels 10 as shown in FIG. 2, FIG. 2A and FIG. 2C in the area forward of support struts 30 and directly to side rails 11 aft of support struts 30.

Figure 3:
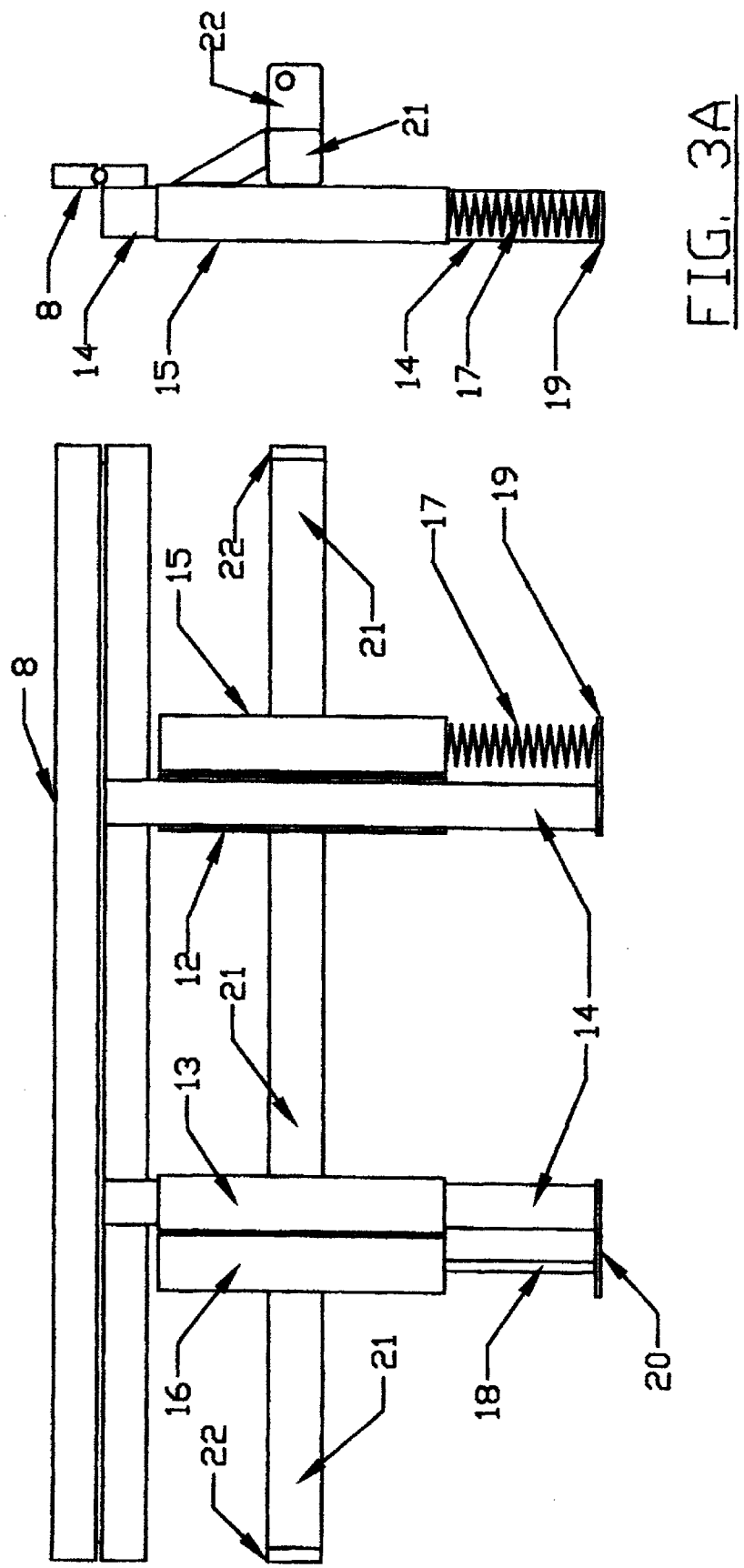
FIG. 3 illustrates the vertical support rack with spring loaded telescoping posts in the extended position prior to installation on a roll-off container truck.

FIG. 3 and FIG. 3A illustrate the vertical support rack 9 of FIG. 1 as assembled with a mechanical spring 17 and an alternate gas spring 18 extended prior to installation on a roll-off container truck. Spring housings 15 and 16 are attached, respectfully, to telescoping posts outer sleeves 12 and 13, all of which are attached to horizontal cross tube 21. Vertical posts 14 which form the inner sleeves of the vertical telescoping posts are inserted into outer sleeves 12 and 13 and attached at the upper ends to hinge-like device 8 and at the lower ends to spring push plates 19 and 20. Connecting plates 22 are provided at both ends of cross tube 21 for the buttress-like struts 30 shown in FIG. 1. After the vertical support rack assembly is installed on the truck's hoist system and springs 17 and 18 are compressed, the assembly will appear as shown in FIG. 4.

Figure 4:
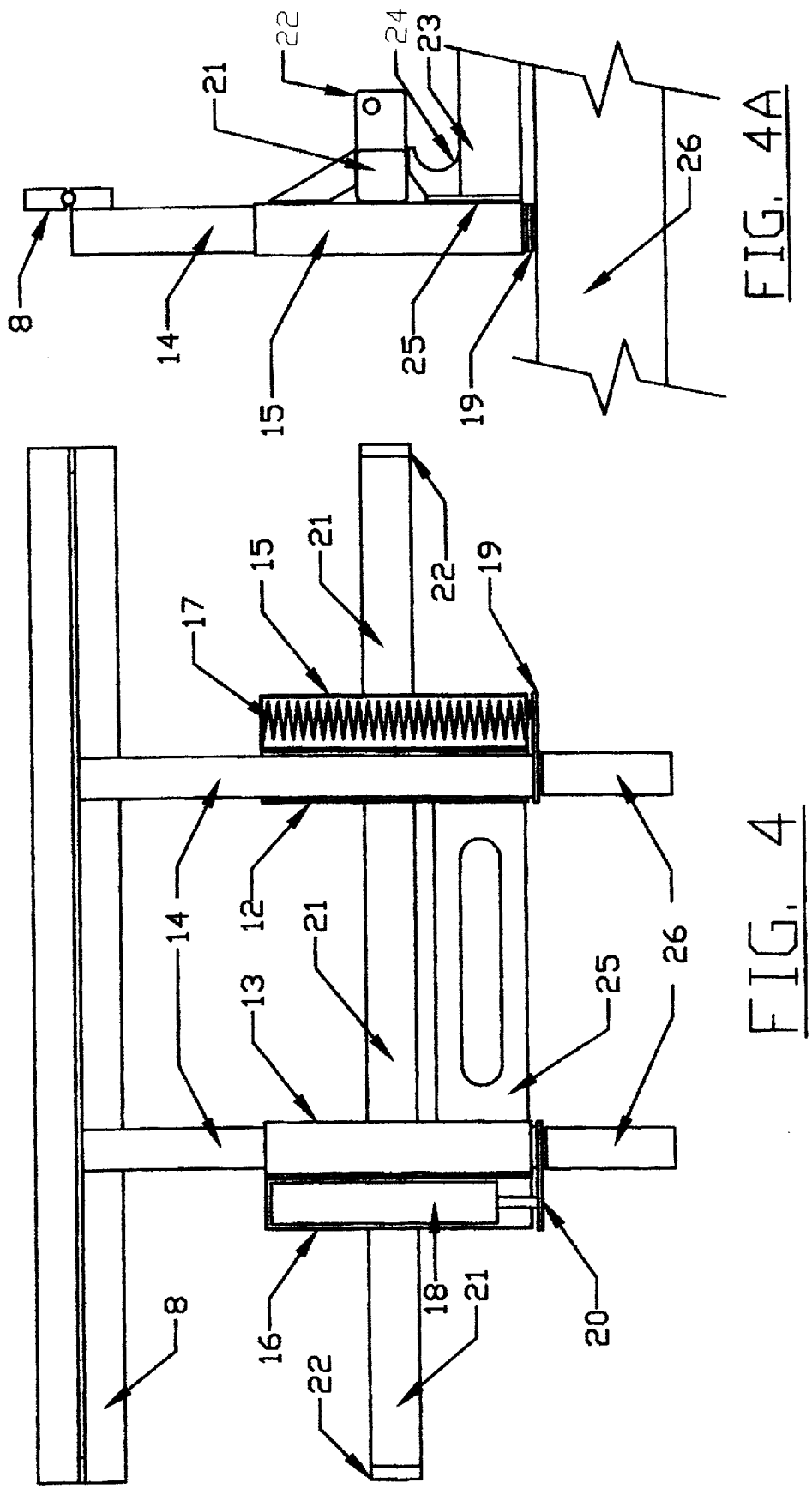
FIG. 4 illustrates the vertical support rack with spring loaded telescoping posts in the compressed position when the truck's hoist is in the lowered position.
Figure 5:
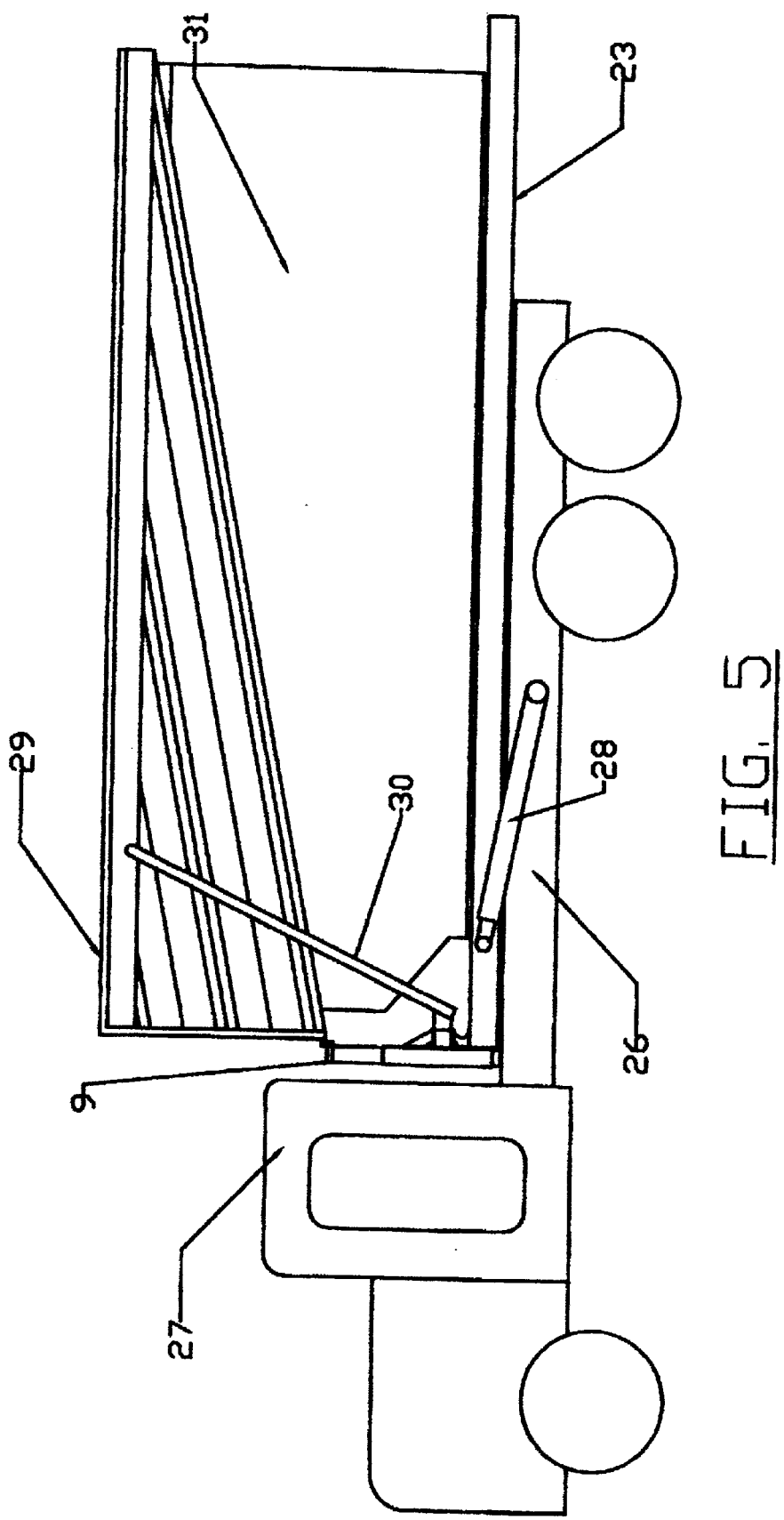
FIG. 5 is an illustration of the top cover tarpping system of this invention installed on a typical roll-off container truck with the truck's hoist in the lowered position and with a larger container, such as one with a 40 yard capacity, on board.
Figure 6:
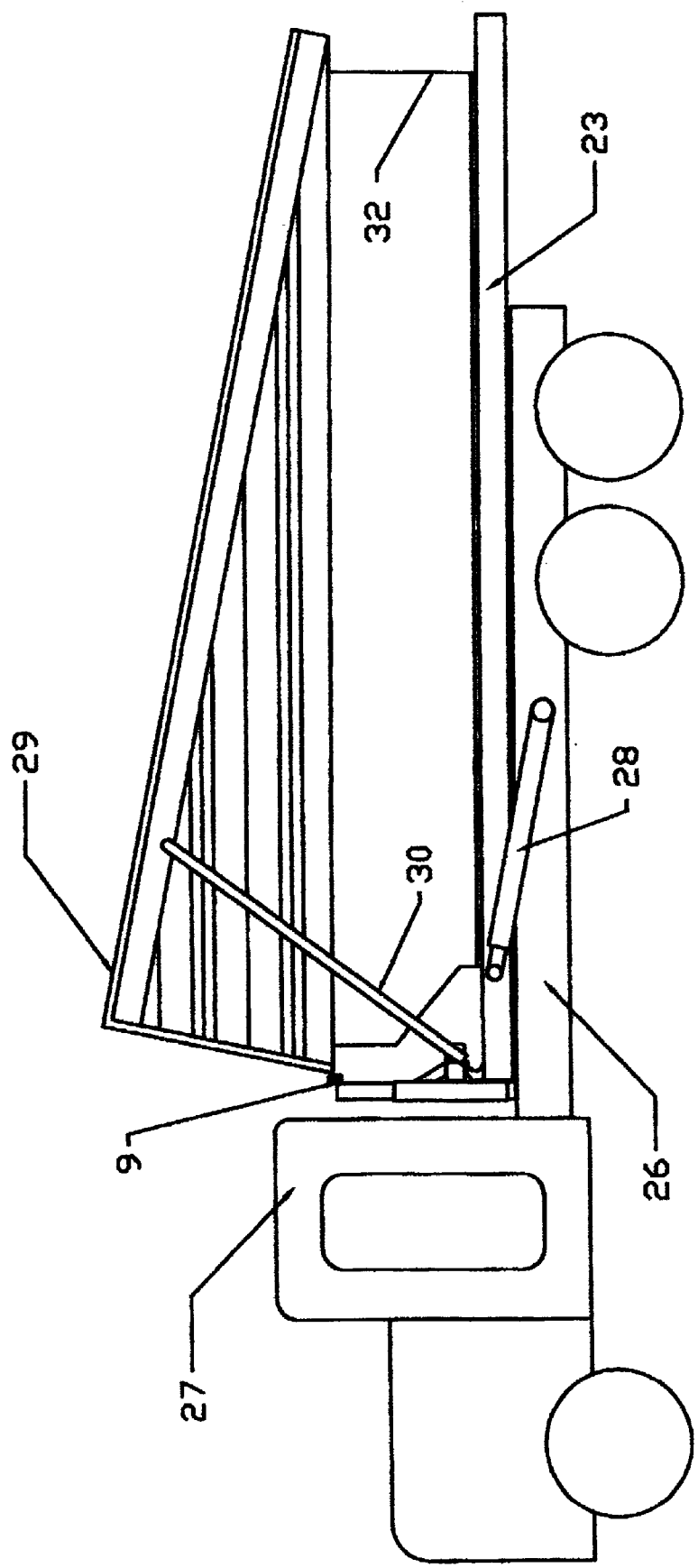
FIG. 6 is an illustration of the top cover tarpping system of this invention installed on a typical roll-off container truck with the truck's hoist in the lowered position and with a smaller container, such as one with a 20 yard capacity, on board.
Figure 7:
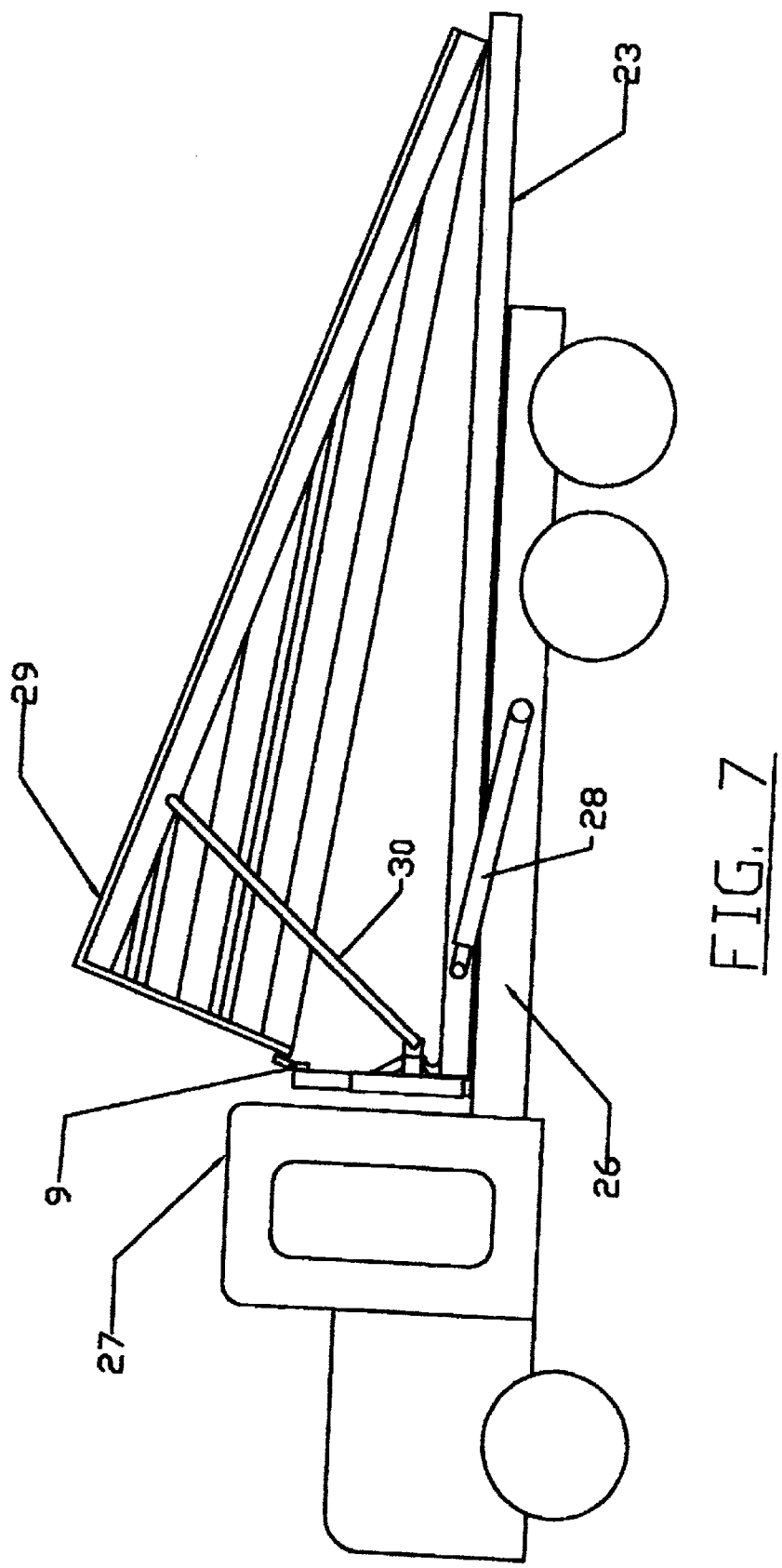
FIG. 7 is an illustration of the top cover tarpping system of this invention installed on a typical roll-off container truck with the truck's hoist in the lowered position without a container on board.

FIG. 4 and FIG. 4A are a front and side view, respectively, of the vertical support rack with the tarpping apparatus or system of this invention installed on a truck and the truck's hoist is in the down or closed position as shown in FIGS. 5, 6 and 7. Outer sleeve 12 of driver side telescoping vertical post is shown with one side removed to show inner post 14. Outer sleeve 13 encases passenger side telescoping vertical post 14. Spring housings 15 and 16 are shown with sides removed to show a mechanical spring 17 and an alternate gas spring 18 enclosed. Attaching spring 17 to driver side vertical post 14 is plate 19 while plate 20 attaches the spring 18 in housing 16 to passenger side vertical post 14. In pre-assembly, outer sleeves 12 and 13 and spring housings 15 and 16 are welded to horizontal cross tube 21 and one to the adjacent other. Hinge-like device 8 is attached to upper ends of vertical posts 14.

Figure 8:
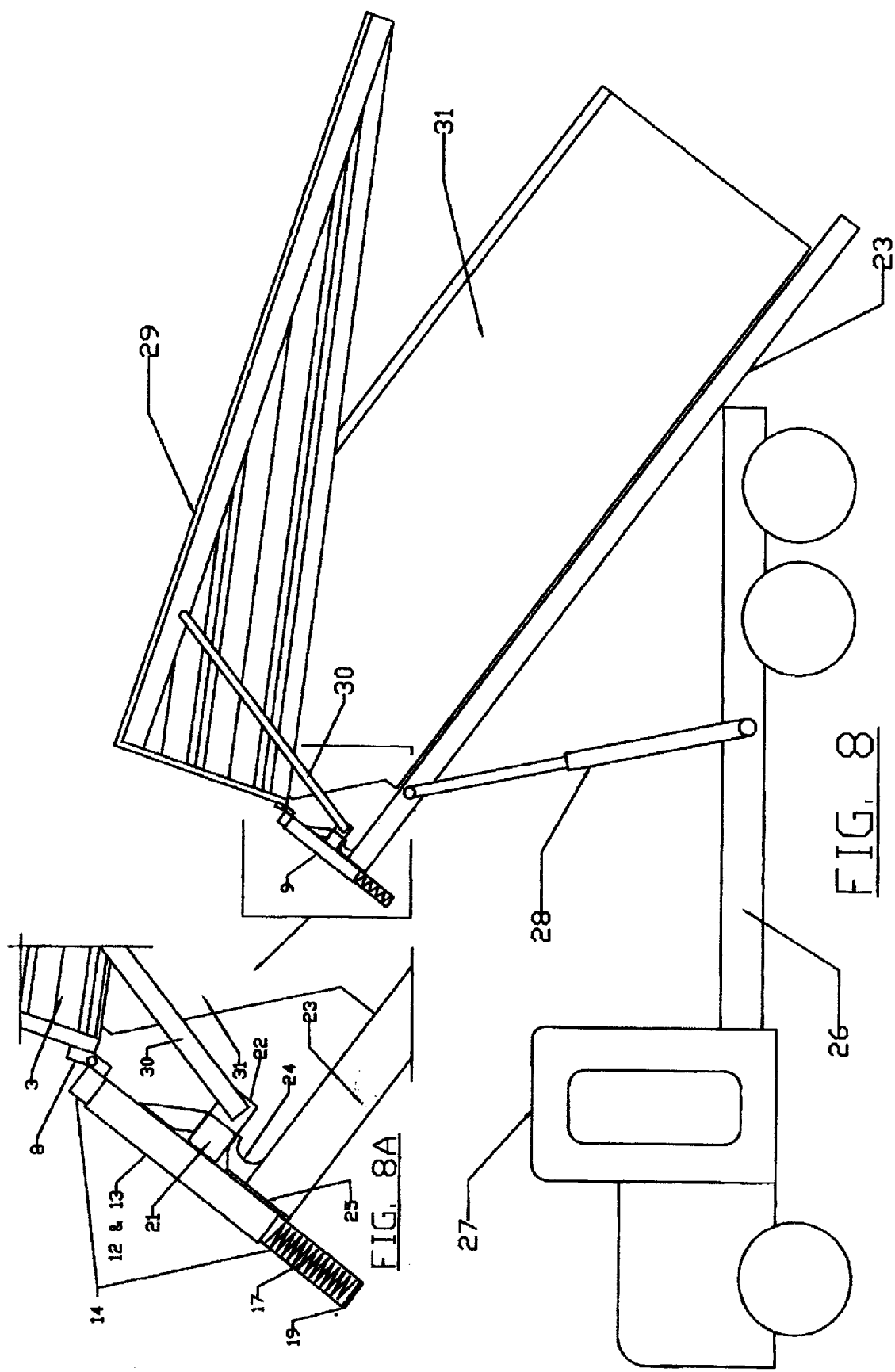
FIG. 8 is an illustration of the top cover tarpping system of this invention installed on a typical roll-off container truck with the truck's hoist in the raised position and with a larger container, such as one with a 40 yard capacity, on board.

During installation, the outer sleeves 12 and 13 are attached to forward plate 25 of the truck's hoist rails 23 and horizontal cross tube 21 is attached to the truck's "C" hook 24. Strut connecting plates 22 are located on both ends of horizontal cross tube 21. The assembly is mounted above the chassis 26 of the roll-off container truck. When hoist rails 23 are raised off of the truck's chassis 26, plates 19 and 20 remain in contact with the truck chassis 26 due to the telescoping action of attached inner posts 14 and the downward push of the compressed springs 17 and 18. As the upward movement of truck's hoist rails 23 continue, outer sleeves 12 and 13 slide up over vertical posts 14; hinge-like connection 8 pulls down on the top cover while the buttress-like struts 30 shown in FIG. 1, attached at connecting plates 22, push up on the top cover causing the top cover to open as shown in FIG. 8.

Attention is now directed to FIG. 5 which illustrates top cover 29, vertical support rack assemblage 9 and supporting struts 30 of this invention installed on a typical roll-off container truck 27 with truck's hoist rail 23 and hydraulic cylinder 28 in the lowered position atop truck chassis 26 with one of the larger containers 31 on board.

FIG. 6 illustrates top cover 29, vertical support rack assemblage 9 and supporting struts 30 of this invention installed on a typical roll-off container truck 27 with truck's hoist rail 23 and hydraulic cylinder 28 in the lowered position atop truck chassis 26 with one of the smaller containers 32 on board.

FIG. 7 illustrates top cover 29, vertical support rack assemblage 9 and supporting struts 30 of this invention installed on a typical roll-off container truck 27 with truck's hoist rail 23 and hydraulic cylinder 28 in the lowered position atop truck chassis 26 without a container on board.

FIG. 8 illustrates top cover 29, vertical support rack assemblage 9 and supporting struts 30 of this invention installed on a typical roll-off container truck 27 with truck's hoist rail 23 and hydraulic cylinder 28 in the raised position above truck chassis 26 with one of the larger containers 31 on board. Insert FIG. 8A illustrates the fastening of outer sleeves 12 and 13 to front plate 25 and horizontal cross tube 21 to "C" hook 24. Also shown in FIG. 8A are container 31, extended driver side spring 17, hinge-like device 8, strut 30 attachment plate 22, inner telescoping post 14, buttress-like strut 30 and side panel 3. As the truck's hoist cylinder 28 retracts, hoist rails 23 are lowered. When push plates 19 and 20 on lower ends of vertical support posts 14 contact truck chassis 26, the downward motion of vertical support posts 14 and the front end of the top cover 29 stop while the remainder of vertical support rack continues downward causing the rear end of the tarpping system 29 to pivot down around the upper end of the struts 30 until the rear end of the top cover 29 contacts the rear end of container 31. When the rear end of the top cover 29 contacts container 31 and the hoist cylinder 28 continues to retract, the inner tube of the telescoping struts 30 slide upward, the outer sleeves 12 and 13 continue downward, springs 17 and 18 are compressed and hoist rails 23 contact truck chassis 26 as shown in FIG. 5 and FIG. 6.

Figure 9:
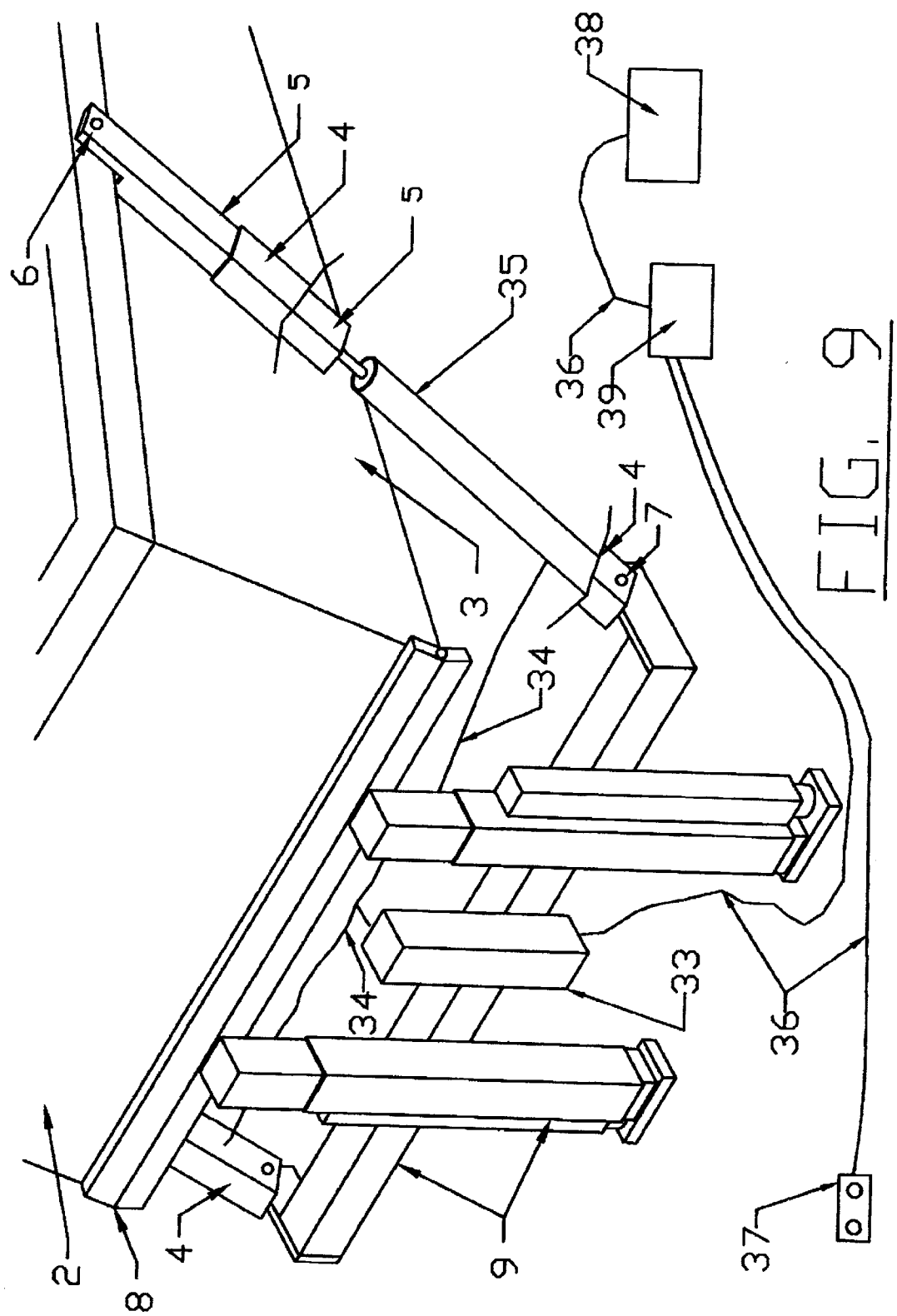
FIG. 9 is an illustration of the assembled tarpping system of this invention with auxiliary hydraulic power prior to installation on a roll-off container truck.

FIG. 9 depicts the forward portion of the assembled tarpping apparatus or system of this invention which is the same as illustrated and described in FIG. 1 except that hydraulic pump and housing 33, hydraulic piping 34, two hydraulic cylinders 35, power and control wiring 36, push button control 37 and junction box 39 have been added as auxiliary equipment. This auxiliary equipment enables the operator to raise and lower top cover 29 independently of hoist rails 23 position. Depressing the up button on push button control 37 runs pump 33 to supply hydraulic fluid, via hydraulic piping 34 to hydraulic cylinders 35 installed in the lower section 4 of the supporting struts, to push the upper sections 5 up to raise or open the top cover through connecting pin 6. Conversely, depressing the down button will cause the top cover to lower or close independently of hoist rails 23 position.

Figure 10:
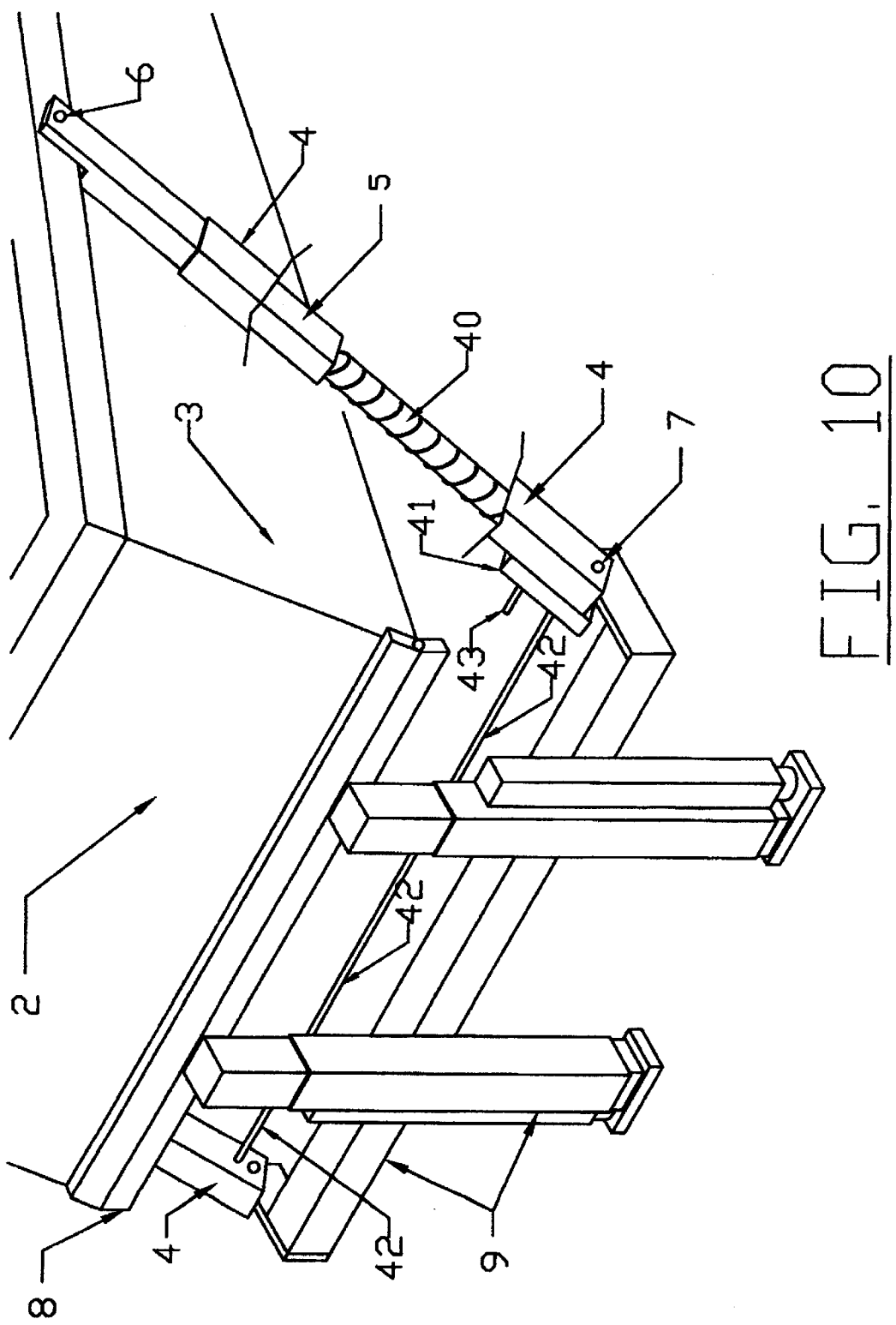
FIG. 10 is an illustration of the assembled tarpping system of this invention with auxiliary mechanical power prior to installation on a roll-off container truck.

FIG. 10 depicts another, optional auxiliary feature to enable the operator to raise and lower the top cover independently of hoist rails 23 position with the addition of jack screws 40 within both support strut lower sections 4, one gear box 41 with power input shaft 43 and connecting shaft 42. Cranking of input shaft, manually or with powered equipment, will cause the top cover to open or close independently of the motion of the hoist rails 23.

What I claim as my invention is:

1. A Top Cover Tarpping System for installation on roll-off container trucks wherein the uppermost structure of said Tarpping System comprises a rectangular roof panel, a rectangular front panel and two triangular side panels assembled in the shape of a roof with an open bottom side, said roof panel pivotally mounted atop a spring loaded telescoping vertical support rack, and a support strut pivotally connected to the roof panel and a forwardmost end of a hoist system of said truck.

2. The System of claim 1, said roof panel comprising a plurality of rigid, full-length sub-panels, each said sub-panel having generally longitudinally extending corrugated ribs to provide beam strength, there being full-length slip joint attachments on both edges of each said full-length sub-panel formed as interlocking configurations having a "T" shape fitting on one edge and a "C" shape fitting on the opposite edge permitting slip together assembly of a cross bar of the "T" within the opening of the "C".

3. The System of claim 1, said roof panel construction further including rigid, full-length rails having full-length slip joint attachments configured as a combination of a "T" shape and a "C" shape which will interlock with further slip joint attachments of sub-panels of said roof panel.

4. The System of claim 1, where the spring loaded support rack is compressed by contact with the truck's chassis and released from contact upon pivoting of the hoist system to provide the force to open the top cover during on and off loading of the containers.

5. The System of claim 1, further incorporating auxiliary power means in the form of one of a hydraulic cylinder and a gear and screw operated device within the two telescoping support struts to provide additional adjustments.

6. A Top Cover Tarpping System for installation on roll-off container trucks wherein the uppermost structure of said Tarpping System comprises a rectangular roof panel, a rectangular front panel and two triangular side panels assembled in the shape of a roof with an open bottom side, said roof panel pivotally mounted atop a telescoping vertical support rack and two telescoping support struts pivotally attached to the roof panel and a hoist system of the truck permitting pivotal motion about the lower edge of the front panel allowing opening and closing of the top cover structure during raising and lowering operations of the truck's hoist system while on and off loading multiple size open top containers, said vertical support rack attached to the forward most end of said hoist system and said pivotal motion being accomplished with the use of hydraulic cylinders in each said telescoping support strut powered by a built-in, self contained pump and control system.

7. The System of claim 6, said roof panel comprising a plurality of rigid, full-length sub-panels, each said sub-panel having generally longitudinally extending corrugated ribs to provide beam strength, there being full-length slip joint attachments on both edges of each said full-length sub-panel formed as interlocking configurations having a "T" shape fitting on one edge and a "C" shape fitting on the opposite edge permitting slip together assembly of a cross bar of the "T" within the opening of the "C".

8. The System of claim 6, said roof panel construction further including rigid, full-length rails having full-length slip joint attachments configured as a combination of a "T" shape and a "C" shape which will interlock with further slip joint attachments of sub-panels of said roof panel.

* * * * *